United States Patent [19]
Ranganath et al.

[11] Patent Number: 5,471,119
[45] Date of Patent: Nov. 28, 1995

[54] DISTRIBUTED CONTROL SYSTEM FOR LIGHTING WITH INTELLIGENT ELECTRONIC BALLASTS

[75] Inventors: Krishnappa Ranganath; Alexander Kurnia, both of Milwaukee, Wis.

[73] Assignee: MTI International, Inc., Menomonee Falls, Wis.

[21] Appl. No.: 255,395

[22] Filed: Jun. 8, 1994

[51] Int. Cl.⁶ .................................................. H05B 41/36
[52] U.S. Cl. .................................. 315/307; 315/DIG. 4; 315/294
[58] Field of Search .................................. 315/307, 291, 315/294, 297, 209 R, 106, DIG. 4, 154, 194, 360, 153, 195, 199, 362, 158, 284, 156; 250/221; 307/16, 40; 340/541, 310.01

[56] References Cited

U.S. PATENT DOCUMENTS

| | | |
|---|---|---|
| 4,225,808 | 9/1980 | Saraceni .................................. 315/307 |
| 4,242,614 | 12/1980 | Vatis et al. ............................. 315/153 |
| 4,388,567 | 6/1983 | Yamazaki et al. ..................... 315/291 |
| 4,798,998 | 1/1989 | Hemphill et al. ...................... 315/297 |
| 4,965,492 | 10/1990 | Boldwyn ................................. 315/156 |
| 5,051,720 | 9/1991 | Kittirutsunetorn ................. 340/310 R |
| 5,055,746 | 10/1991 | Hu et al. ................................. 315/291 |
| 5,068,576 | 11/1991 | Hu et al. ................................. 315/291 |
| 5,107,184 | 4/1992 | Hu et al. ................................. 315/291 |
| 5,130,613 | 7/1992 | Szuba ....................................... 315/291 |
| 5,264,823 | 11/1993 | Stevens ................................ 340/310 A |

OTHER PUBLICATIONS

A Digital Lighting System for the Theatre, Master Thesis of Fine Arts Yale School of Drama pp. 1–48, May 1974 by Dirk Epperson.
Philips Lighting; Product Information; IFS 800 Lighting Control System; Oct. 1990.
Philips Lighting; IFS Lighting Control System Overview; Sep. 1990.

*Primary Examiner*—Ali Neyzari
*Attorney, Agent, or Firm*—Wells, St. John, Roberts, Gregory & Matkin

[57] ABSTRACT

A lighting system comprising: an AC power line; an electronic ballast including structure for receiving and interpreting commands transmitted on the power line to control dimming of a fluorescent lamp, the ballast including structure defining an individual address, the ballast including structure for initiating an arc to start the fluorescent lamp, for limiting current through the fluorescent lamp after the arc is initiated, and for dimming the light output of the fluorescent lamp; and a control element spaced apart from the electronic ballast and including structure for sending commands on the power line in a format that the ballast is capable of interpreting, the control element including structure for sending an address with the command, the ballast including structure for comparing the sent address with its individual address and responding to the command if the sent address matches its individual address.

19 Claims, 9 Drawing Sheets

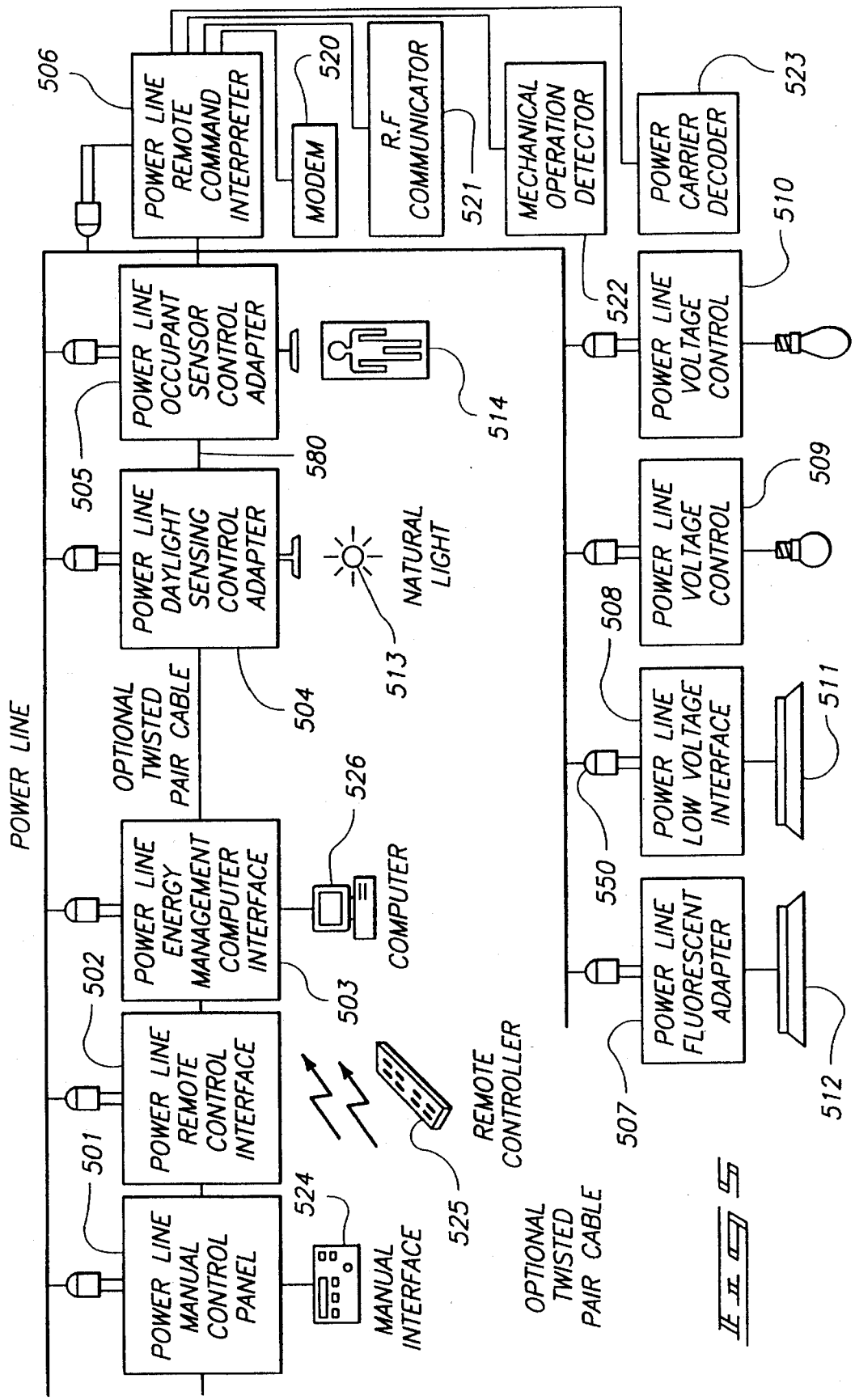

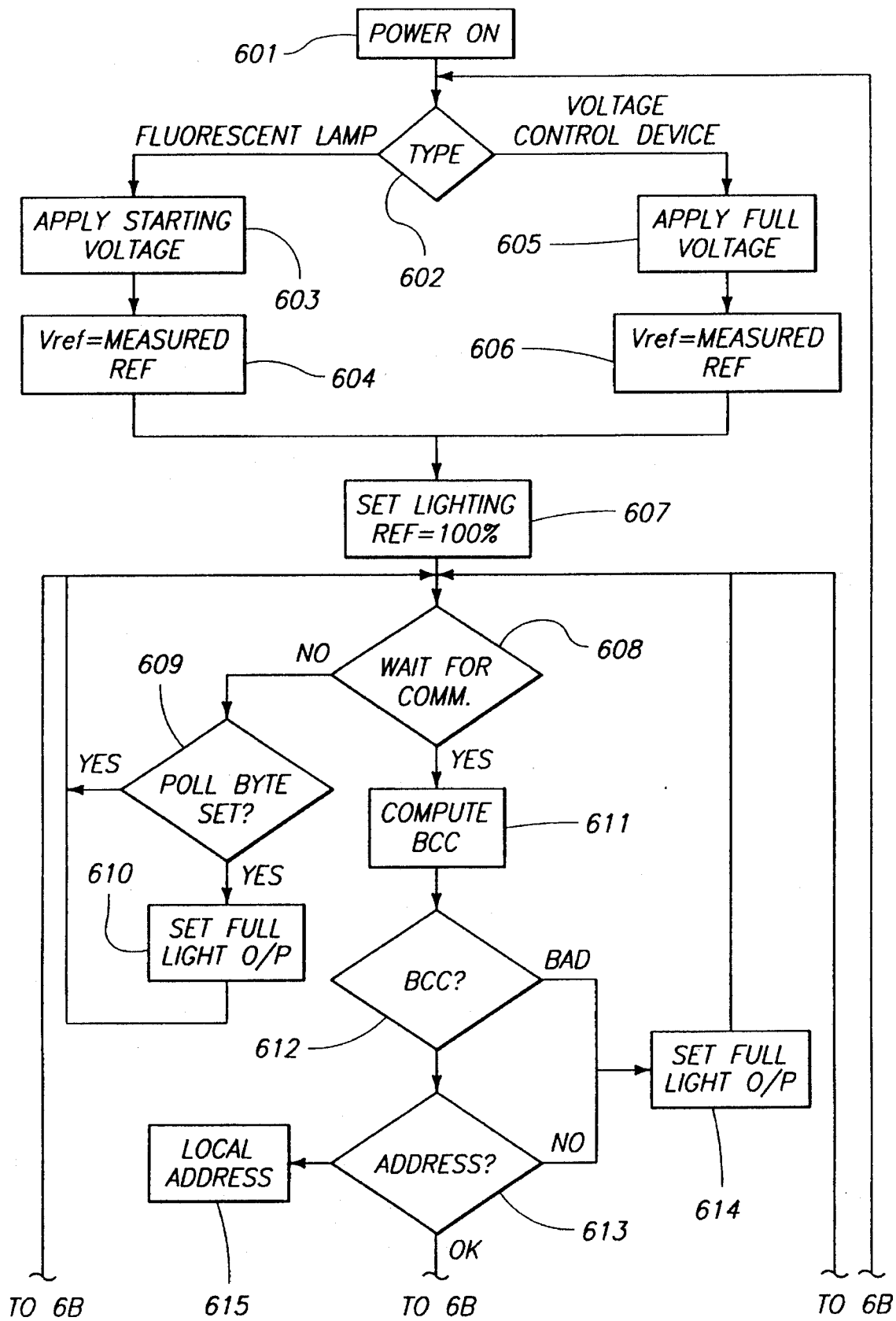

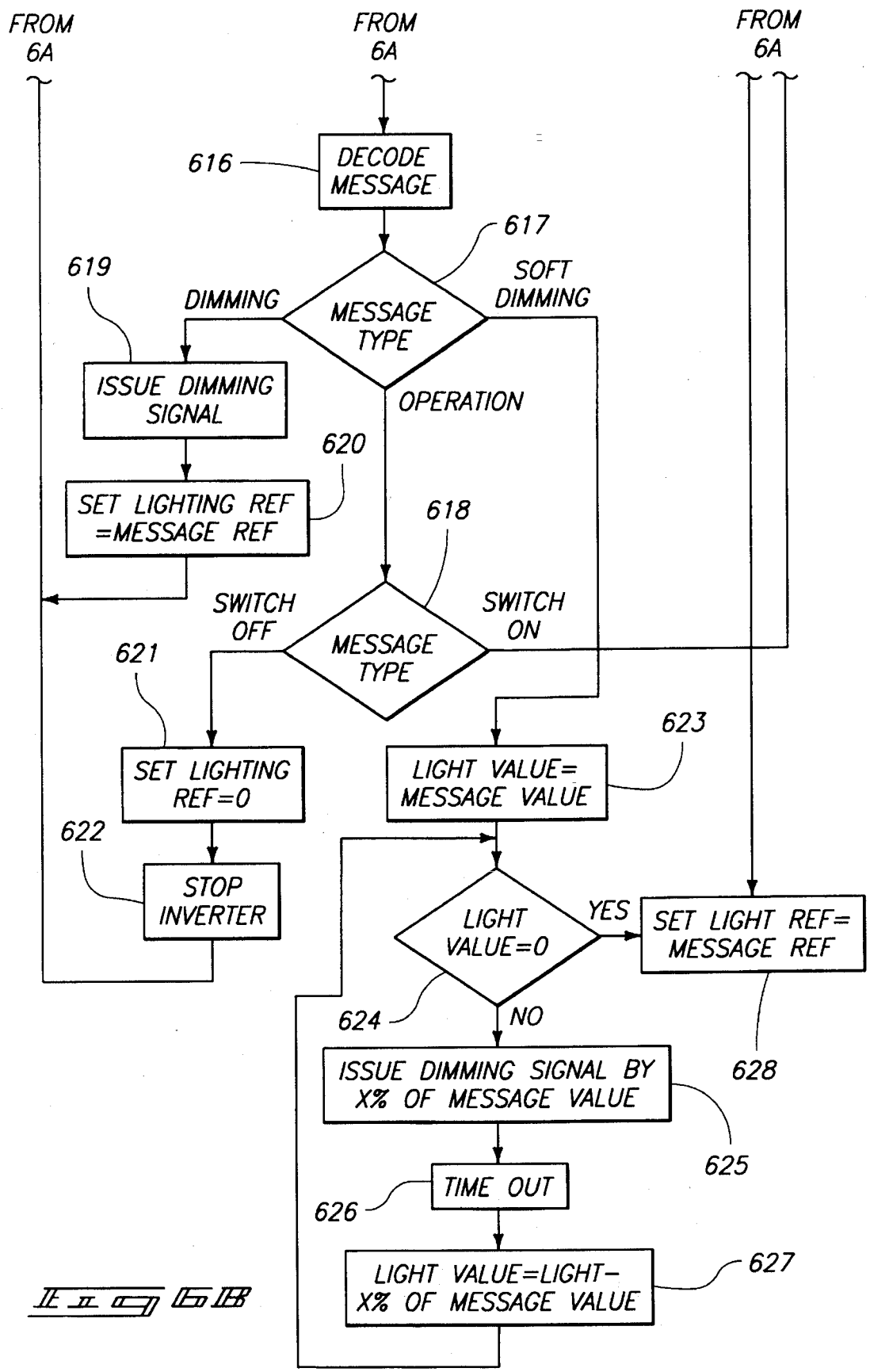

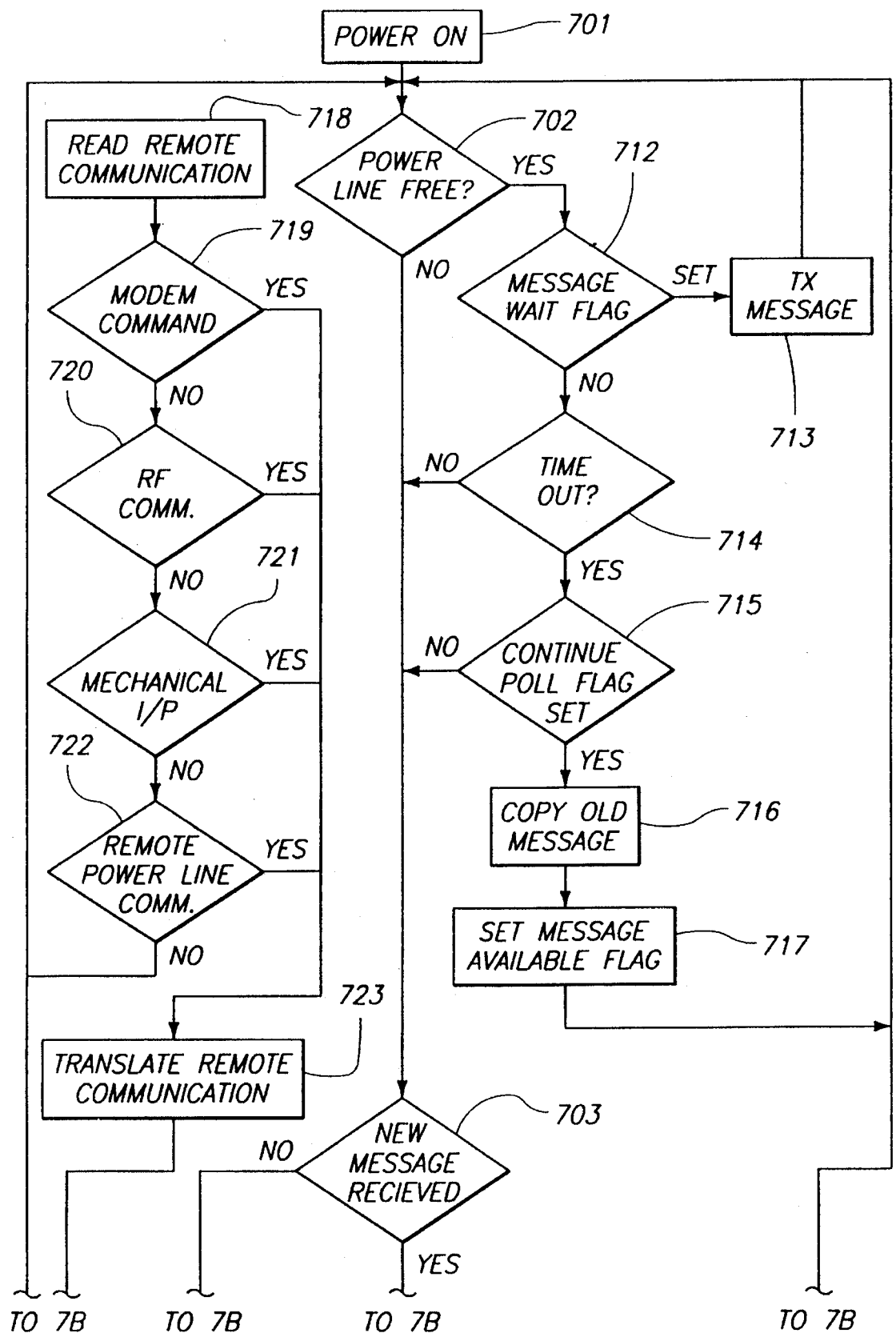

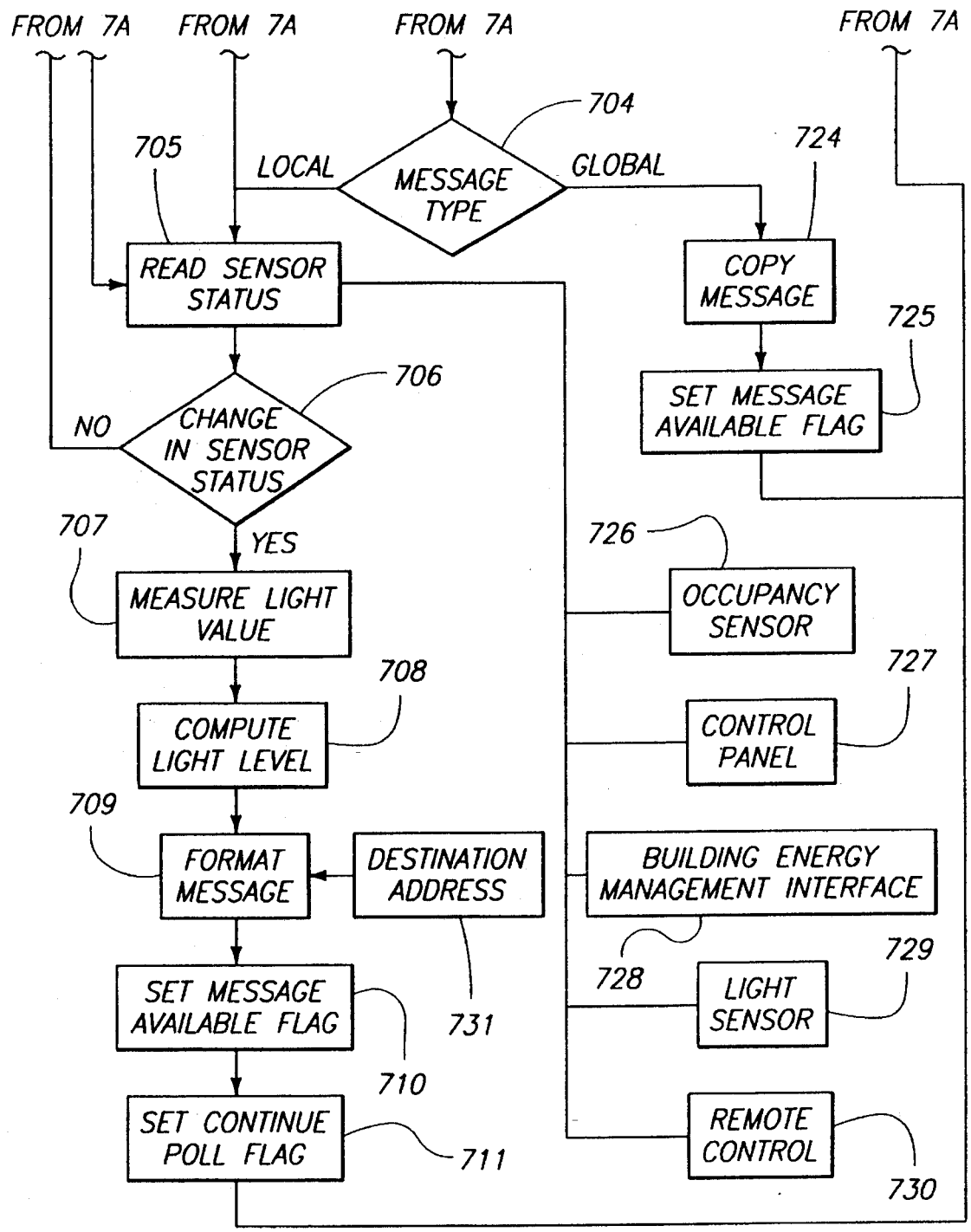

DISTRIBUTED CONTROL SYSTEM FOR LIGHTING WITH INTELLIGENT ELECTRONIC BALLASTS

FIELD OF THE INVENTION

The invention relates generally to lighting control systems and, more particularly, to lighting control systems incorporating electronic ballasts.

BACKGROUND OF THE INVENTION

An electronic ballast is a device which applies a high voltage across a fluorescent lamp to initiate an arc and start the lamp, and to limit current through the fluorescent lamp after the arc is initiated.

Dimming electronic ballasts are known in the art. Such dimming ballasts typically respond to a control element which communicates over a low voltage hardwired interface to the dimming ballast to reduce the intensity of light emitted from a fluorescent tube or tubes connected to the dimming ballast. The low voltage interface requires wiring through the walls of the building. One control element can be used to control several dimming ballasts and associated fluorescent tubes; however, if it is desired to dim one of the fluorescent tubes, all fluorescent tubes attached to the control element must be dimmed. If it is desired to add new electronic ballasts and fluorescent tubes in a building, and have them controlled by the same control element, low voltage control wires from the control element to the new ballast must be installed. If it is desired to separately control the light intensity of two different fluorescent tubes, or two different sets of tubes, separate control elements are required, along with separate sets of wires from the control elements to the dimming ballasts. A dimming ballast and associated control element are fairly expensive; e.g., approximately $250 for both. If it is desired to separately control portions of a building, such as when certain sections of the building are empty of occupants, separate control elements are required, resulting in great expense.

U.S. Pat. No. 5,051,720, issued to Kittirutsunetorn on Sep. 24, 1991 and incorporated herein by reference, discloses a system for accessing a remote site electrical device using a modem and then accessing a power line. The power line interface uses slave devices to communicate with a master control, which is a remote computer. This is a master-slave control system, which is expensive and cumbersome to install and maintain.

U.S. Pat. Nos. 5,055,746, 5,068,576, and 5,107,184, issued to Hu et al. and incorporated herein by reference, disclose use of a power line interruption code to control dimming of an electronic dimming ballast. The disclosed method does not provide a complete solution and the method is complex. U.S. Pat. No. 5,264,823, issued to Stevens on Nov. 23, 1993 and incorporated herein by reference also discloses a power line communication system, but does not provide a system as contemplated by applicants.

SUMMARY OF THE INVENTION

The invention provides a system wherein a single control element can be used to individually control any dimming ballast in a building, facility, or designated area, without the need to provide control wires between the control element and each electronic ballast. Different electronic ballasts controlled by the control element can be controlled to provide differing light intensities in different rooms even though controlled by one control element.

Each electronic ballast is provided with an individual address, and can be individually controlled by a control element. Communications between the control element and the electronic ballasts occur over a conventional AC power line. A single control element can be employed to control different ballasts in different manners; for example, a control element can be used to instruct one ballast to dim, without affecting the other ballasts in the room or building. If it is desired to add new ballasts and fluorescent tubes, they can be controlled by an existing control element without the need to add a control wire from the control element to the new ballast. Because one control element can be used to individually control separate electronic ballasts, the number of control elements employed in a facility can be reduced, and expense can be saved.

The dimming ballasts dim their fluorescent tubes for a minimal illumination level when no illumination is requested by a control element. This is because the life of the fluorescent tube can be extended by dimming the tube instead of turning it on and off.

It is known to employ a power line as an effective moderate speed communication network.

The invention provides a system wherein a power line is employed to communicate with integrated ballasts, dimming modules (for use with conventional dimming ballasts), voltage control modules (for use with incandescent and similar lamps), and distributed control elements in a lighting system. The term "integrated ballast" as used herein refers to an intelligent electronic dimming ballast which has an individual address, which can be controlled using communications over a conventional AC power line, and which will be described below in further detail.

During peak power demand periods, a utility company can send a signal over its power lines to the integrated ballasts informing them that a peak power demand period is about to occur. Dimming of its fluorescent tube can then occur; e.g., over a period of a time so that the reduction in light intensity is not noticeable; thus saving the utility company from needing to buy more expensive power from others or increasing its capacity. Savings realized by the utility company can be passed on to users of the integrated ballasts. The users of the integrated ballasts will, of course, be able to override or ignore the signal from the utility company.

The integrated ballasts have several levels of addressing so that a command can be send from a control unit over the power line to all integrated ballasts, to a certain group of integrated ballasts, or to an individual integrated ballast.

The users can provide signal attenuation at a transformer point if they desire to prevent signals from neighboring buildings from affecting their integrated ballasts.

Alternatively, the users can allow the integrated ballasts to respond to signals from neighboring buildings, if desired, because each integrated ballast has its own address. Signals on the power line can be received and retransmitted so that signal attenuation on the power line is not a problem. The system of the invention provides a user with low cost dimming ballasts and associated control elements and thus increased energy savings in the user's premises. The majority of energy used today is used on lighting (illumination). Use of electronic ballasts can result in savings of up to 30% over conventional incandescent lighting, but by employing an integrated ballast (an intelligent electronic dimming ballast) in accordance with the invention, energy savings of up to 85% over conventional incandescent lighting can be realized.

The design of the integrated ballasts of the present invention adds very little cost to the existing electronic ballast design. These integrated ballasts have unique field programmable identification codes (addresses) and a power line communication interface. The power line communication interface included in the integrated ballasts is a commercially available Frequency shift keying [FSK] or Amplitude shift keying [ASK] or spread spectrum modulation [SSM] transreciever. The communication interface included in the integrated ballasts interprets encoded data from the power line and causes the ballast to change the light intensity of its associated fluorescent tube, or turns the fluorescent tube on or off.

A unique identification code set by the user on the integrated ballast is used to identify whether a command is meant for that integrated ballast or for some other integrated ballast or other device. By using these identification codes, the controlling elements can differentiate between different ballasts and send commands to specific integrated ballasts. The integrated ballasts include a central micro-controller for interpreting FSK or ASK or SSM data communication, for address comparison, and for dimming control. This central micro-controller includes RAM for keeping local data variables, ROM for program storage, and signal control hardware.

The system of the invention optionally further includes means for interfacing with conventional dimming ballasts. More particularly, the system includes one or more dimming modules that output a low voltage signal for controlling the conventional dimming ballasts. The power line modules receive commands from the control elements via the power line, interpret the commands, and send a low voltage signal to the conventional dimming ballast to control the conventional dimming ballast and the light intensity produced by a fluorescent tube associated with the conventional dimming ballast. Thus, only minimal additional low voltage wiring is needed; i.e., from the power line module to the conventional dimming ballast, instead of all the way from the control element to the conventional dimming ballast.

The system of the invention optionally further includes means for interfacing with conventional incandescent lamps or other types of lamps capable of being dimmed by reducing the voltage applied to the lamp. More particularly, the system includes one or more voltage control modules that output a varying voltage signal for controlling the conventional incandescent or other lamps. The voltage control modules are similar to the dimming modules described above, except that dimming logic of the dimming module is replaced with an output voltage control dimming circuit. The voltage control dimming circuit uses transistors or triacs to reduce the output voltage to the incandescent or other similar lamp.

The system of the invention includes one or more of various types of control elements for controlling the integrated ballasts, the dimming modules, and the voltage control modules. These control elements may be of a type that accepts a manual input, or of a type that receives an environmental input. The control element of different types can all communicate over a power line.

There may be communications between the control elements. For example, one control element may be programmed to cause dimming at a certain time of day, and a human user may use a different manual control element to indicate that full intensity is desired, and the control elements may communicate among each other to establish which control element takes precedence over the other. The control elements use either the power line itself for communication or use an optional twisted pair wire to communicate between themselves. The control elements each have a communication interface for encoding or decoding data transmitted or received on power line or twisted pair wire. Each of the control elements has a unique field programmable identification.

The system provides sectional control of lighting and introduces flexibility for the integration of multiple control elements on the same power line.

In addition to command transmission, the control elements have the ability to receive and interpret a global command (e.g., from a utility or another control element) and re-transmit this command to increase signal strength on a wide area of power network.

The control elements can be of a type that interprets manual settings by a user to change the light output at a particular electronic ballast (or dimming module or voltage control module), can be of a type that changes the light output based on occupant sensing, or can be of a type that can both interpret manual settings and perform occupant sensing. The control elements can be of a type that detect the level of natural light, and send a command over the power line to change the interior lighting to a predetermined level or can provide an interface for an energy management computer.

The system also provides a control interface which can interpret commands from outside the user premises by means of modem, radio communication, mechanical contacts or power line carrier communication and can translate the commands to local power line communication commands to change the light level or switch on or switch off the lamps.

Other features and advantages of the invention will become apparent to those of ordinary skill in the art upon review of the following detailed description, claims, and drawings.

DESCRIPTION OF THE DRAWINGS

FIG. 5 is a block diagram of a system comprising control elements, the integrated ballast of FIG. 1, the voltage control module of FIG. 2, and the dimming module of FIG. 4.

FIG. 6 is a flow chart illustrating how the integrated ballast of FIG. 1, the voltage control module of FIG. 2, and the dimming module of FIG. 4 operate.

FIG. 7 is a flow chart illustrating how control elements communicate and interface with the power line.

DETAILED DESCRIPTION OF THE PREFERRED EMBODIMENT OF THE INVENTION

Shown in the various figures is a system (see FIG. 5) wherein a single control element (e.g., the manual interface 524) can be used to individually control any integrated ballast (see FIG. 1) in a building, facility, or designated area, without the need to provide control wires between the control element and each electronic ballast. Different integrated ballasts controlled by the control element can be controlled to provide differing light intensities in different rooms even though controlled by one control element. An electronic ballast is a device which applies a high voltage across a fluorescent lamp to initiate an arc and start the lamp, and to limit current through the fluorescent lamp after the arc is initiated. The system embodying the invention comprises integrated ballasts. The term "integrated ballast" as used herein refers to a novel intelligent electronic dimming ballast in accordance with the invention which has an individual address, and which can be controlled using communications over a conventional AC power line.

Figure 1:
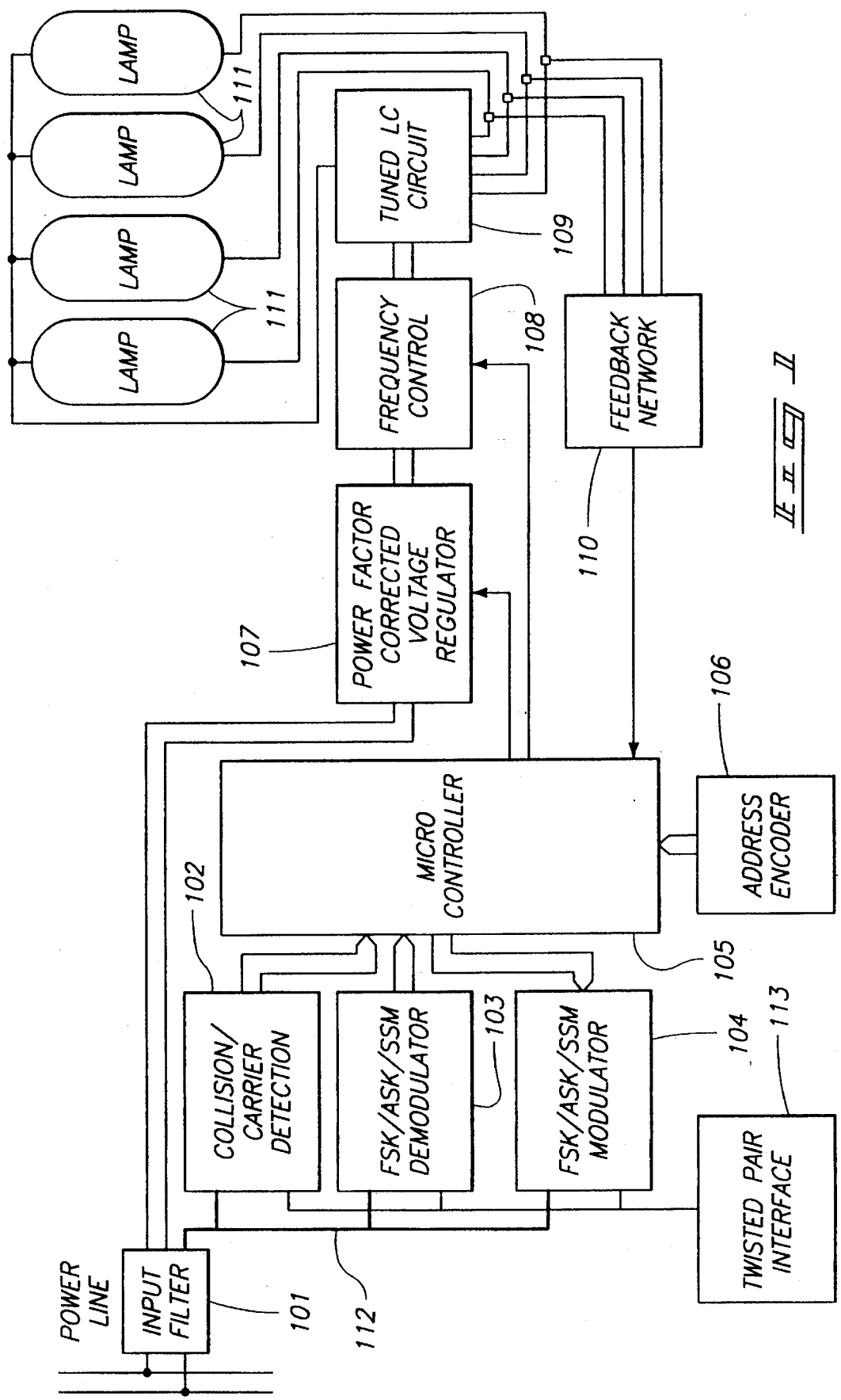
FIG. 1 is a block diagram of an integrated ballast, for receiving commands over a power line, embodying various features of the invention.

FIG. 1 is a block diagram of an integrated ballast in accordance with the invention and including a power line communication interface. The integrated ballast includes an input filter 101 in communication with a power line. The input filter 101 is a conventional filter using an inductor and capacitor to filter noise from the dimming ballast to the power line. The integrated ballast includes a sensing winding 112 on the filter couples the modulated communication signal to and from the ballast. The integrated ballast further includes a demodulator 103 communicating with the input filter 101. The command signal on the power line is sensed by the sense winding 112 and fed into the demodulator 103 which has ability to decode Frequency Shift Keying [FSK], Amplitude Shift Keying [ASK] or Spread Spectrum Modulation [SSM], or whatever coding system is employed. Any appropriate coding system protocol may be employed. For example, the Open Systems Interface Reference Model (OSIRM) developed by the International Standards Organization (ISO) may be employed. The integrated ballast includes a collision/carrier detection unit 102 which determines the presence or absence of a command signal on the power line.

The decoded signal is in the form of serial bits of binary value 1 or 0. The integrated ballast further includes a micro-controller which receives these serial bit signals and format them into a standard digital ASCII character set. The ASCII string is called a packet. A packet is a message with address and some error correction code attached to it.

A standard packet can contain one or all of the following fields (square brackets differentiate one field from another):

[START OF TEXT character]
[ADDRESS FIELD1]
[ADDRESS FIELD2]
[ADDRESS FIELD3]
[MESSAGE TYPE]
[MESSAGE]
[BLOCK CHECK character]
[END OF TEXT character]

A START OF TEXT character identifies the presence of a new packet. ADDRESS FIELD1, ADDRESS FIELD2, and ADDRESS FIELD3 denotes the message destination. MESSAGE TYPE identifies whether a message is global command or specific command, this is applicable only to control module. MESSAGE denotes the actual command which sets the state of lamp light. A BLOCK CHECK character tests the integrity of the message packet before it is executed by the micro-controller. END OF TEXT character denotes completion of packet reception.

The micro-controller 105 stores a program to coordinate all functions and interprets commands input from the demodulator 103. Valid command reception is checked by the micro-controller 105 after reception of END OF TEXT and only if the BLOCK CHECK character matches a internally computed value. After performing the validity check, the micro-controller 105 checks the received address against the local address of the particular integrated ballast. Each integrated ballast has an individual address encoded by a set of switches or memory locations 106. If there is a match between the local address and the received address, the micro-controller reads message and verifies the grammar of message. The integrated ballast further includes a voltage regulator 107 communicating with the input filter 101 and communicating with the micro-controller 105. The integrated ballast further includes a frequency control unit 108 communicating with the micro-controller 105. If the message is to control the light intensity level then the micro-controller 105 sends an analog signal to the frequency control unit 108 and to the voltage regulator 107. The frequency control unit 108 is fed power factor corrected DC voltage from the regulator 107. The voltage output from the regulator 107 is in proportion to the signal the regulator 107 receives from the micro-controller 105. The regulator 107 includes a commercially available power factor correction circuit to make the input AC current sinusoidal and in phase with AC input voltage, thus achieving high power factor and low input current harmonics. By using a combination of frequency and voltage the micro-controller 105 can control the output operating voltage to reduce or increase light intensity output. The micro-controller 105, the modulator, and demodulator can be included in an IC chip, such as a Neuron chip developed by The Echelon Corp, Palo Alto, Calif.

In cases where the integrated ballast receives a command from the power line to turn off all the lamps, then the micro-controller 105 stops the frequency control unit 108, thus stopping the complete inverter of the ballast. If for some reason there is no activity on the power line for a predetermined period, then the micro-controller 105 re-starts the frequency control unit 108 and operates the integrated ballast at full light output.

The integrated ballast includes an output stage which uses a combination of voltage and frequency control by employing a commercially available circuit to achieve operating voltage control. The output stage of the integrated ballast includes a tuned resonant LC circuit 109. When the integrated ballast is powered up, the controller 105 changes the frequency in such amount as to initiate a high starting voltage in tuned resonant LC circuit 109 to turn on one or more fluorescent lamps 111 connected to the integrated ballast. The integrated ballast further includes a feedback network 110 connected between the lamps 111 and the micro-controller 105. After the lamps 111 are turned on, the feedback network 110 returns a signal to the micro-controller 105 which is in proportion to the lamp power. Using this feedback network 110, the micro-controller 105 can adjust the power to a rated value for the lamps 111, and use this value as a standard reference. Subsequent dimming commands received from the power line are interpreted by changing the value of power in reference to the power up value.

Figure 2:
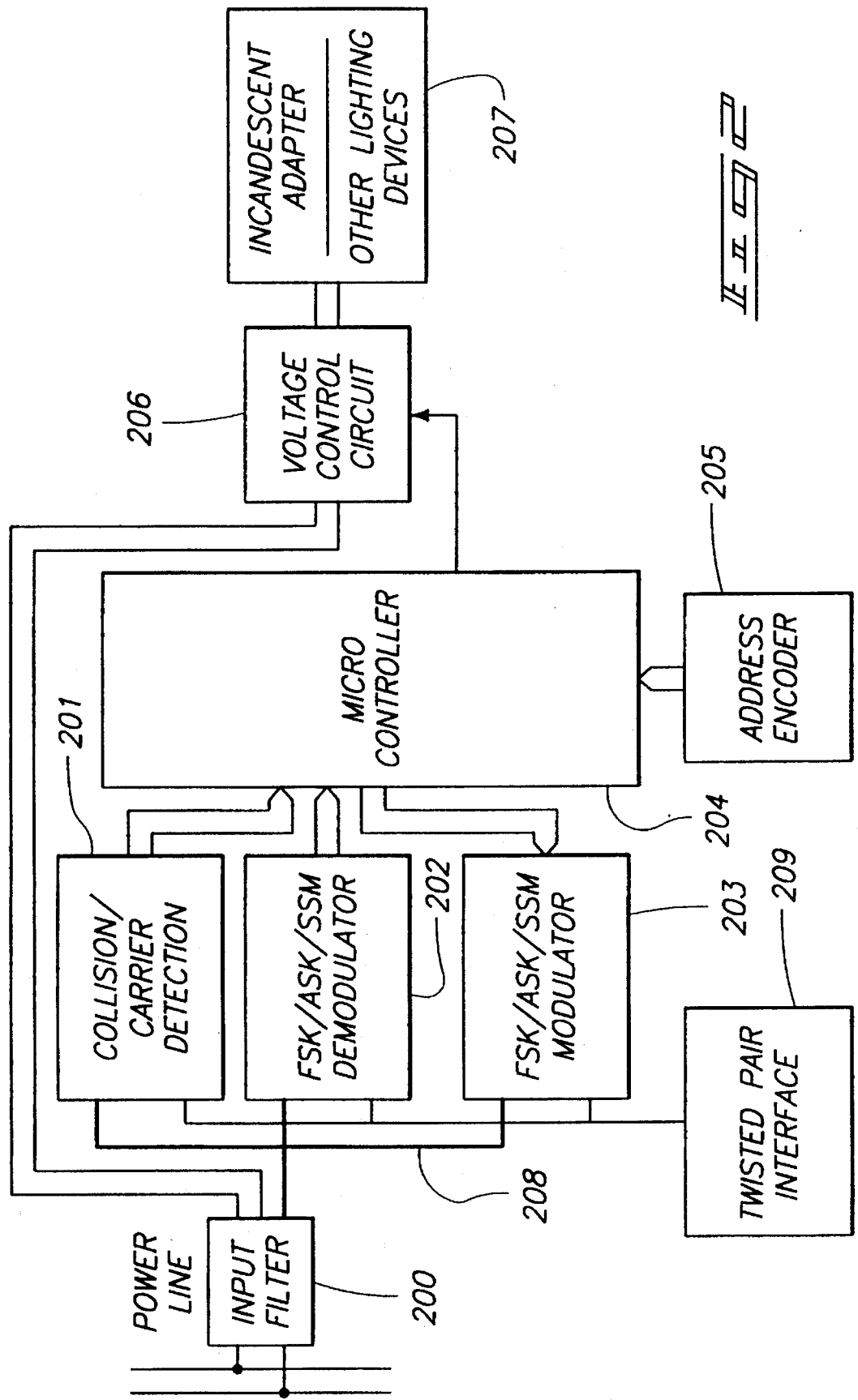
FIG. 2 is a block diagram of a voltage control module, for receiving commands over a power line, and for use with incandescent or similar lamps.

FIG. 2 is a block diagram of a voltage control module, for receiving commands over a power line, and for use with incandescent or similar lamps. The system of the invention optionally includes one or more of these voltage control modules. The voltage control module is similar to the circuit in FIG. 1, employing a filter 200, modulator 203, demodulator 202, and address encoder 205 which operate in a manner analogous to the filter 101, modulator 104, demodulator 103, and address encoder 106 of FIG. 1, except that in the place of the voltage regulator 107, frequency control unit 108 and tuned LC circuit 109, there is a voltage control circuit 206. The function of the voltage control circuit 206 is to regulate the input power line voltage to the lamp. This is achieved by using in the voltage control circuit 206 a commercially available circuit which employs a thyristor or transistor for series connection to an incandescent or similar lamp 207. The thyristor in the voltage control circuit 206 is turned on and off in phase with the frequency of input sinusoidal voltage to change the power delivered to the lamp 207. The amount of power delivered to the lamp 207 is determined by the micro-controller 204 using power line communication commands as explained with regard to the integrated ballast shown in FIG. 1.

Figure 3:
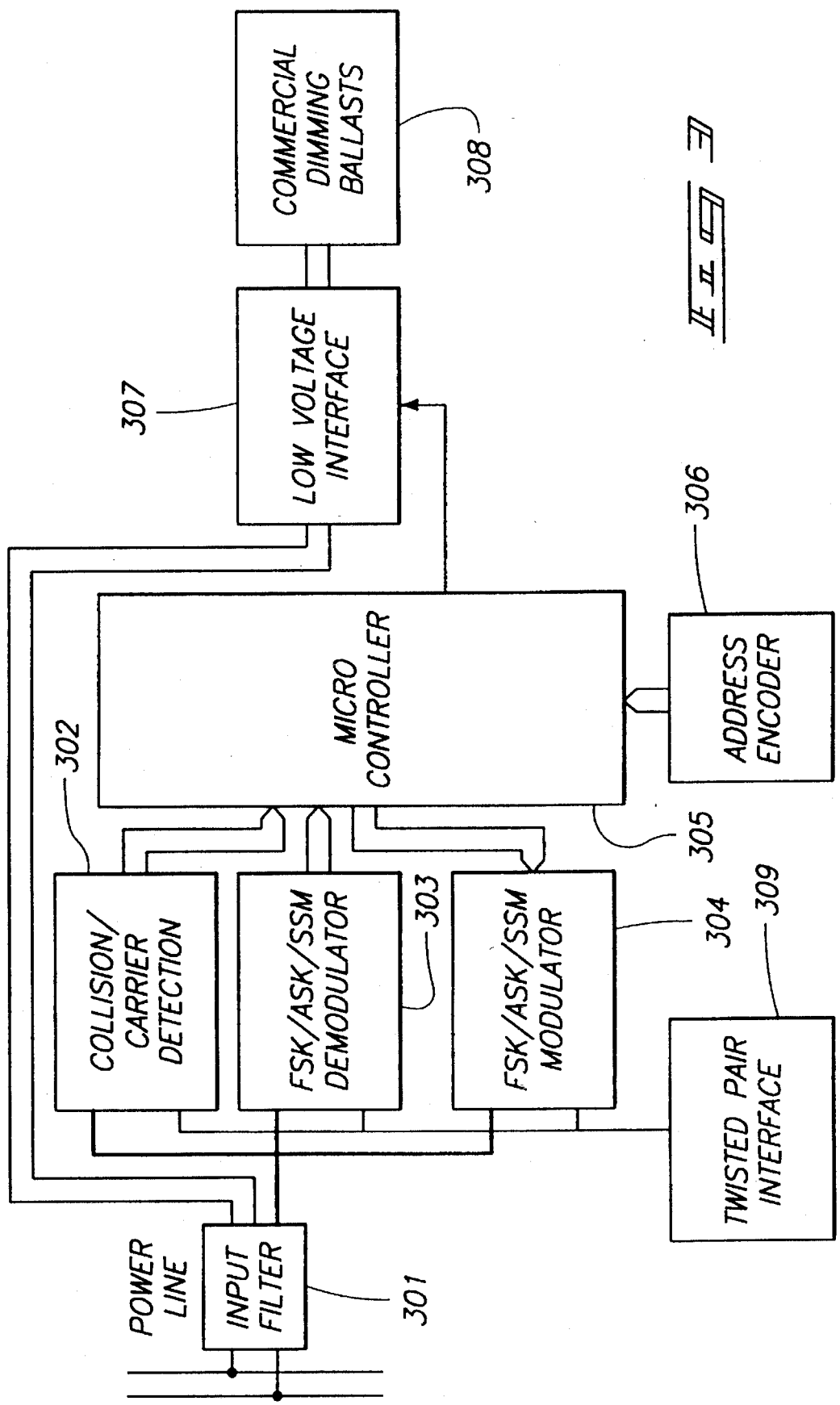
FIG. 3 is a block diagram of a dimming module, for receiving commands over a power line, and for use with conventional dimming ballasts.

In the present market, the dimming ballasts sold use a low voltage interface to change the light intensity level produced by an associated fluorescent tube. For the system of the invention to provide compatibility with these conventional dimming ballasts 308, the system optionally further includes one or more dimming modules as shown in FIG. 3. The dimming module shown in FIG. 3 includes a combination of power line communication means 301–306 and a low voltage interface 307. In this dimming module, after the micro-controller 305 determines what light level is requested over the power line, it outputs an analog signal in proportion to the requested light level using the low voltage interface 307. The low voltage interface 307 is conventional in design, and is compatible with present industry standard specifications.

Figure 4:
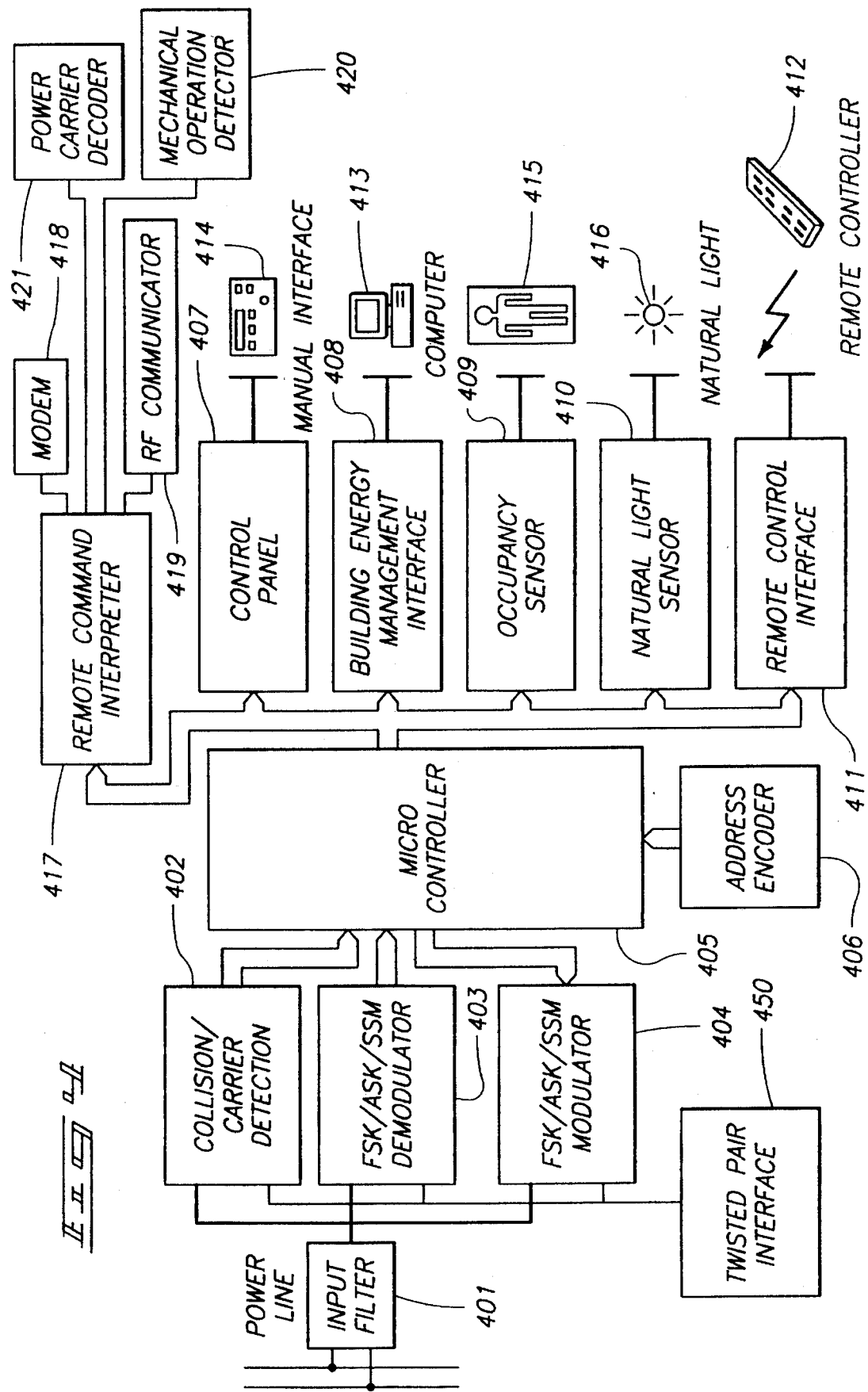
FIG. 4 is a block diagram of a control element, for sending commands over a power line to the integrated ballast of FIG. 1, the voltage control module of FIG. 2, and the dimming module of FIG. 3 to control the light output intensity of lamps associated with the integrated ballast, the voltage control module, and the dimming module, respectively.

The system further includes control elements shown in FIG. 4 which send commands over the power line to integrated ballasts, dimming modules, or voltage control modules. The control element includes a communication interface which is similar to that of the integrated ballast of FIG. 1, employing a filter 401, modulator 404, de-modulator 403, and a micro-controller 405 which operate in a manner analogous to the filter 101, modulator 104, de-modulator 103, and micro-controller 105 of the integrated ballast of FIG. 1. Each control element can carry a specific identification code 406 just like the integrated ballast of FIG. 1. The micro-controller 105 interfaces to one or multiple sensing units 407 through 411.

Each control element includes one or more of the elements 417, 407, 408, 409,410, or 411 shown in FIG. 4. Several control elements can be connected to a power line.

A control panel 407 interfaced to the micro-controller 405 has manual interface ability like an encoder or a panel of switches 414 using which user can set the desired light level or pre-program a timed lighting operation.

A building management interface 408 provides an interface between the power line communication system and computers 413 or similar complex control modules.

An occupancy sensor 409 interfaced to the micro-controller 405 signals the presence or absence of people 415 in a specified area. Using this information, the micro-controller can cause a command to be sent, over the power line, to an integrated ballast, a dimming module, or a voltage control module, to reduce or increase light level (e.g., reduce light level if nobody is present).

A commercially available daylight sensor 410 interfaced to micro-controller 405 detects the presence of natural light 416. Using this information, the micro-controller 405 can cause a command to be sent, over the power line, to an integrated ballast, a dimming module, or a voltage control module, to reduce or increase light level (e.g., reduce light level if natural light is present).

In order to provide flexibility and make operation simpler a remote control unit 411 employing infrared light or radio communication can interface to the micro-controller 405 and interpret signals sent from a remote unit 412. The interpreted signals are used by the micro-controller 405 to determine the operation of lamps depending on what a human user keys in on the remote unit 412.

A power line remote command interpreter 417 can interpret commands sent from a modem 418, via radio communication 419, power line carrier signals 421 or mechanical contacts 420 to issue signals to the micro-controller 405. Depending on the signal, the micro-controller can format a message with its local address and transmit the message over the power line to integrated ballasts, dimming modules, or voltage control units.

The main function of each control element is to translate sensor input into valid messages meant for an integrated ballast (FIG. 1), a voltage control module (FIG. 2), or a dimming module (FIG. 3). After receiving signals from a sensor, these control units format the message in the form of a packet as described earlier. The Address fields ADDRESS1, ADDRESS2, ADDRESS3 are properly encoded by using the local unique identifier and the packet is sent over power line using the modulator 404. These control elements have the ability to communicate between themselves using an optional twisted pair interface 450 (113 in FIG. 1, 209 in FIG. 2, 309 in FIG. 3, 580 in FIG. 5).

A message transmission from a control unit is initiated only if there is no collision or carrier detection signal from collision/carrier detection unit 402. In case of attempted simultaneous message transmission by two control elements, the control elements generate a random number in a pre-determined range and use that as a waiting time before retrying to transmit. Every message sent by any control element is monitored by all the control elements. If there is an universal command sent by one of the control elements, the rest of control elements record and reproduce this command to increase signal integrity on the power line.

FIG. 5 shows a system employing the control elements, integrated ballasts, dimming modules, and voltage control modules discussed in FIGS. 1 through 4.

The user's premises power line wiring is effectively used by both the controlling elements 501,502,503,504,505,506 and lighting elements 507,509,510 which are connected to the power line through wiring or plug in adapters 550. A fluorescent lamp fixture is connected to an integrated ballast 507 (FIG. 5 and FIG. 1) through a AC line connector 550 (FIG. 5). The integrated ballast is pre-programmed with a unique identification code. After receiving a valid message over the power line, with a proper address, this integrated ballast controls the light intensity level of the fluorescent fixture 512.

A dimming module or low voltage dimming interface circuit 508 (FIG. 3 and FIG. 5) is interfaced to a conventional, commercially available, dimming ballast fixture 511 (FIG. 5) which uses low voltage interface for controlling the light output. The dimming module 508 translates commands sent by control elements over the power line into low voltage signal compatible with commercial dimming ballasts.

The voltage control modules 509 and 510 (FIG. 2 and FIG. 5) provide power control to non-fluorescent lamps connected to them. The power setting is determined by the control elements which send specific commands using power line communication addressing these units.

Manual setting of light level, or scheduled light switching operation is initiated by the user using manual interface 524, which is connected to control panel 501. The control panel 501 uses power line communication to send specific command to the lighting elements 507, 508, 509, or 510 to change the light level. A remote control unit 525 can achieve the same function with a power line remote control interface 502 while giving more flexibility to the user. An energy management control system 526 can be interfaced to the power line system by using a power line energy management system 503 so that the user will have more flexibility to plan the lighting. To achieve energy saving by using daylight 513, daylight sensing can be performed with a power line day light sensing control adapter 504. This adapter senses the intensity or presence of daylight 513, and issues a command on the power line to reduce or increase light levels inside the premises. A power line occupant sensor 505 senses the presence or absence of people 514 and sends commands over the power line to electronic ballasts, dimming modules, or voltage control modules to change the light level or switch the lamps on or off by addressing specific lamps.

In cases when there is a necessity for an out of site control element, then power line remote command interpreter 506 is employed. The remote command interpreter 506 uses a commercial interface such as a modem 520, radio communication interface 521, power line decoder 523, or mechanical operation detector 522 to control the light level. Upon receiving a command from one of the sensors 520, 521, 522, or 523, the remote command interpreter 506 sends a command on the power line to change the lighting levels.

An optional twisted pair cable 580 (113 in FIG. 1, 209 in FIG. 2, 309 in FIG. 3, 450 in FIG. 4) can be connected between all the control elements to synchronize the signalling.

FIG. 6 shows the program flow in integrated ballasts, dimming modules, or voltage control modules, as functional blocks. At step 601, power is on. The program logic will be different depending (step 602) on whether the lighting element is an integrated ballast or dimming module on the one hand, in which case a starting voltage is necessary 603 to start the lamp, or whether the lighting element is a voltage control element on the other hand where just full voltage is applied 605. In both cases, the full light output feedback is measured as reference value 604 or 606. This reference value 604 or 606 is used to set reference variable at 100% at step 607. After starting the lamps, the micro-controller waits 608 for communication. If there is any communication on the power line meant for it, or any other device then a poll byte is incremented 608, 611, 612, 613, 614. This poll byte flag is constantly checked 609 to see if there is any communication between control elements and lighting elements. If there is no communication for a prolonged time, then the micro-controller assumes control element failure (or assumes that no control elements have been installed) and restores 610 100% light. If an error free packet is received 612 by proper Block check character BCC, and the received address matches 613 the local address 615, then the packet is decoded 616 to check 617 the message type. The message type can be a lamp On or OFF situation 618, in which case proper action is taken by switching 621, 622 lamps on or off. If the message type is to dim the light output, the dimming value is read into a register at step 623 and converted 619, 620 into a proper analog signal for dimming circuit. In cases when the message is a soft dimming request, then using a loop 624 and delay 626, the light value is reduced in steps 625 to make user comfortable with reduced light.

FIG. 7 shows the program flow in a control element. At step 701, power is on. The micro-controller in the control element uses carrier or collision to detect 702 whether the power line is free for communication or not. If there is a prepared message 712 for transmission, and the power line is free, the message is transmitted 713. In order to make sure that there is a continued communication between control elements and lighting elements a time out re-transmission of message is carried out using a poll flag 714, 715, 716, 717. If there is a new message received 703 from some other control element, it is checked 704 to see if that is a global message. If the message is global, then it is re-transmitted 724, 725 to increase signal integrity. The sensor status is read 705 from various sensors like occupancy sensor 726, control panel 727, energy management system 728, light sensor 729, remote control interface 730, and remote command interpreter 723. In cases when the sensor has to process outside signals 718, 719, 720, 721, or 722, then a translated signal is used to process the command. The sensor input is formatted with the proper address 731 and set for transmission 707, 708, 709, 710, 711.

Thus, a system has been provided wherein a power line is employed to communicate with integrated ballasts, dimming modules (for use with conventional dimming ballasts), voltage control modules (for use with incandescent and similar lamps), and distributed control elements. Each electronic ballast is provided with an individual address, and can be individually controlled by one of the control elements. A single control element can be employed to control different ballasts in different manners. By using the power line for communication, the need for wiring new ballasts to a control element is eliminated. The need to have a separate control element for separate ballasts is also eliminated.

Modifications may be made to the preferred embodiment described and illustrated herein without departing from the spirit of the invention as expressed in the following claims.

We claim:

1. A lighting system comprising:

an AC power line;

an electronic ballast adapted to be used with a fluorescent lamp, said ballast including means for receiving and interpreting commands transmitted on said power line to control dimming of the fluorescent lamp, said ballast including address defining means for defining an address identifying said ballast, said address defining means providing a plurality of levels of addressing, said ballast including means for initiating an arc to start the fluorescent lamp, for limiting current through the fluorescent lamp after the arc is initiated, and for dimming the light output of the fluorescent lamp; and a control element spaced apart from said electronic ballast and including means for sending commands on said power line in a format that said ballast is capable of interpreting, said control element including means for sending an address with said command at any selected one of a plurality of levels corresponding to said plurality of levels of addressing provided by said address defining means of said ballast, said ballast including means for comparing said sent address with the address defined by said address defining means and responding to said command if said sent address matches the address defined by said address defining means, at the level selected by said control element.

2. A lighting system in accordance with claim 1 and further comprising a second control element including means for sending commands on said power line, wherein said first control element comprises collision/carrier detection means for determining if said second control element is attempting to communicate over the power line and for delaying sending of a command from said first control element, on the power line, for a randomly selected amount of time if said collision/carrier detection means determines that said second control element is attempting to communicate over the power line.

3. A lighting system in accordance with claim 1 and further comprising a second control element including means for sending commands on said power line, wherein said first control element comprises means for monitoring whether said second control element is communicating over the power line and for retransmitting commands sent by said first control element.

4. A lighting system in accordance with claim 1 wherein said control element comprises an occupancy sensor.

5. A lighting system in accordance with claim 1 wherein said control element comprises a daylight sensor.

6. A lighting system in accordance with claim 1 wherein said control element comprises a remote control unit.

7. A lighting system in accordance with claim 1 wherein said control element sends commands to said ballast, over the power line, using frequency shift keying.

8. A lighting system in accordance with claim 1 wherein said control element sends commands to said ballast, over said power line, using amplitude shift keying.

9. A lighting system in accordance with claim 1 wherein said control element sends commands to said ballast, over said power line, using spread spectrum modulation.

10. A lighting system in accordance with claim 1 and further comprising a second electronic ballast including means for receiving and interpreting commands transmitted on said power line to control dimming of the fluorescent lamp, said ballast including means defining an individual address, said ballast including means for initiating an arc to start the fluorescent lamp, for limiting current through the fluorescent lamp after the arc is initiated, and for dimming the light output of the fluorescent lamp, wherein said control element can control a selected one of said first mentioned and said second ballast.

11. A lighting system in accordance with claim 1 wherein said ballast includes a micro-controller, a voltage regulator connected to said power line and controlled by said micro-controller, a frequency control circuit connected to said voltage regulator and controlled by said micro-controller, and a tuned LC circuit connected to said frequency control circuit, wherein said lighting system further comprises a fluorescent lamp connected to said ballast, and wherein said micro-controller controls voltage output by said voltage regulator and controls frequency output by said frequency control circuit to control light intensity of said fluorescent lamp in response to a command from said control unit.

12. A lighting system in accordance with claim 1 and further comprising a dimming module including means for receiving commands, over the power line, from said control element, and means for causing a conventional dimming ballast to respond to said commands.

13. A lighting system in accordance with claim 12 wherein said dimming module includes address defining means for defining an address to identify said dimming module, means for comparing an address sent by said control element with the address defined by said address defining means of said dimming module, and means for responding to said command if said sent address matches the address of said dimming module.

14. A lighting system in accordance with claim 1 and further comprising a voltage control module adapted to be used with an incandescent lamp, said voltage control module including means for receiving commands, over the power line, from said control element, and means for dimming the incandescent lamp in accordance with said commands.

15. A lighting system in accordance with claim 14 wherein said voltage control module includes means for defining an address identifying said voltage control module, means for comparing said address sent by said control element with the address defined by said address defining means of said voltage control module, and means for responding to said command if said sent address matches the address defined by said address defining means of said voltage control module.

16. An electronic ballast including means for receiving and interpreting commands transmitted on an AC power line to control dimming of a fluorescent lamp, said ballast including means defining an individual address, said ballast including means for initiating an arc to start the fluorescent lamp, for limiting the current through the fluorescent lamp after the arc is initiated, and for dimming the light output of the fluorescent lamp, and means for comparing an address included in a command received from the power line with the individual address of said ballast and for responding to said command if said sent address matches the address of said ballast, said ballast including an integrated circuit which contains a demodulator that demodulates commands send on the power line, and which integrated circuit also contains a micro-controller connected to said demodulator, said micro-controller interpreting demodulated commands, said ballast further comprising a voltage regulator controlled by said micro-controller and adapted to be connected to the power line, a frequency control circuit connected to said voltage regulator and controlled by said micro-controller, and a tuned LC circuit connected to said frequency control circuit, wherein said micro-controller controls voltage output by said voltage regulator and controls frequency output by said frequency control circuit in response to the demodulated commands.

17. A control element including means for receiving an input indicative of desired light intensity, means for sending commands on an AC power line to an electronic ballast, and means for sending an address with said command for separately controlling separate ballasts, said control element including collision/carrier detection means for determining if a second control element is attempting to communicate over the same power line and for delaying sending of a command on the power line for a randomly selected amount of time if said collision/carrier detection means determines that the second control element is attempting to communicate over the power line.

18. A lighting system in accordance with claim 1 and further comprising a utility company providing power on said power line, said utility company selectively providing a command on said power line indicative of an approaching peak demand period, wherein said ballast includes means for responding to said command by initiating dimming.

19. A lighting system in accordance with claim 1 and further comprising a utility company providing power on said power line, said utility company selectively providing a command on said power line indicative of an approaching peak demand period, wherein said ballast includes means for responding to said command by causing dimming over an extended period of time sufficient so as to be unnoticeable to a human observer.

* * * * *